United States Patent [19]
Johnson et al.

[11] 3,799,675
[45] Mar. 26, 1974

[54] DIRECTION DETERMINING SYSTEM

[75] Inventors: Philip M. Johnson, Windham; Wilfrid G. Dudevoir, Nashua, both of N.H.

[73] Assignee: Sanders Associates, Inc., Nashua, N.H.

[22] Filed: Dec. 7, 1972

[21] Appl. No.: 313,084

[52] U.S. Cl................... 356/152, 250/199, 340/26, 340/29, 343/106
[51] Int. Cl............................ G01b 11/26, H04b 9/00
[58] Field of Search ............ 356/141, 152; 250/199; 343/102, 106; 340/26, 29, 347 P

[56] References Cited
UNITED STATES PATENTS
3,662,180   5/1972   Jorgensen et al. ............... 356/152

Primary Examiner—Maynard R. Wilbur
Assistant Examiner—S. C. Buczinski

[57] ABSTRACT

A direction determining system is described in which pulses of energy are transmitted in coded patterns to a sector of space so that an observer anywhere within this sector can determine his angular position with respect to a reference direction through the transmitter. A feature is the transmission of reference pulses of energy to the entire sector and their use in the receiver to establish an intensity reference for comparison with the intensity of the coded information pulses so that the adverse effects of atmospheric turbulence are minimized.

12 Claims, 14 Drawing Figures

DIRECTION DETERMINING SYSTEM

BACKGROUND OF THE INVENTION

1. Field of the Invention

This invention relates generally to direction determining systems and particularly to such systems in which coded patterns of energy are transmitted from a known location so as to enable a remotely located observer to determine this angular position by noting the patterns he receives.

2. Description of the Prior Art

One system of the kind mentioned above is described in U.S. Pat. No. 3,662,180 to Jorgensen and Johnson. Briefly stated, this patent describes a system in which a cylindrical mask is formed with transparent and opaque areas arranged in a binary code such as the ray code. The mask is rotated about a lamp in such a way as to bring segments of the code successively into operative relation with a projection lens so that these segments are projected successively into a predetermined sector of space. An observer in this sector of space may determine his angular relation to a reference plane through the system by noting the sequence and timing of the pulses of light he receives. Another such system is described in the copending application of P.M. Johnson and R.M. Northrup and W.G. Dudevoir, Ser. No. 146,392 filed May 24, 1971, now U.S. Pat. No. 3704070, entitled "Direction Determining System" and assigned to the same assignee as in the instant application. In this application, separate masks each bearing a different pattern and each representing one segment of the code, are each provided with a lamp and projection system thereby enabling the transmission of greater peak power per pulse with the same size of lamps.

Systems such as above described operate by transmitting a series of code patterns, each comprising alternate light and dark (illuminated and non-illuminated) areas. To determine where he is, the observer, either unconsciously, when using his unaided eye, or deliberately, when using sophisticated equipment, compares the received intensity with a reference intensity level. If the received intensity is greater than the reference he decides that he is in a light area; if less, in a dark area. At short ranges there is little difficulty. But as the range increases, the difference between the intensity received in light and dark areas decreases, making accurate determination of position more difficult. This difficulty is increased by atmospheric turbulence which causes the intensity of the projected pattern to vary in a random manner with time and spatial position. Such variation makes it difficult to select a reference level to use as a basis of comparison. Such difficulties limit the useful range and resolution obtainable.

It is a general object of the present invention to provide an improved direction determining system.

Another object is to provide such a system with increased range and resolution capabilities.

Another object is to provide such a system in which the deleterious effects of atmospheric turbulence are minimized.

SUMMARY OF THE INVENTION

Briefly stated, the invention is based on the concept of transmitting a reference pulse of energy so as to establish a reference intensity level which takes into account the then existing atmospheric turbulence and using this reference intensity level as a basis of comparison with the received intensity of the information pulses. New reference pulses are transmitted frequently enough (for example between each information pulse or each group of information pulses) so that there is no significant change in turbulence between the transmission of the reference and information pulses.

BRIEF DESCRIPTION OF THE DRAWING

For a clearer understanding of the invention reference may be made to the following detailed description and the accompanying drawing, in which.

DESCRIPTION OF PREFERRED EMBODIMENT

As previously mentioned, systems of the kind under discussion are based upon the optical projection of a sequence of binary digital (for example, light and dark) code patterns. A receiver, either the human eye or an electronic detector, makes a number of determinations as to whether the projected pattern is light or dark at its particular location. By use of some sort of memory to record these determinations, and a knowledge of the sequence of projection of the patterns, the receiver can decode the sequence to reveal its own position.

When the patterns are projected through a stable atmosphere or through only a short path, the positions of the dividing lines between light and dark on the various edges on the patterns may be found with extreme precision by amplitude (that is, intensity) sensing. In other words, the intensity at the exact geometric optics position of an edge in the pattern is always the same value, and is equal to the average intensity in the pattern. If the receiver senses an intensity greater than this value, it may correctly decide that its position is on the light or illuminated side of the geometrical optics image of the edge. If the receiver senses a lower value it is obviously on the other side of the edge.

Figure 1:
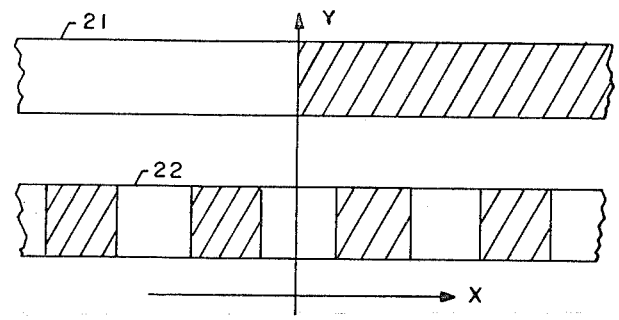
FIG. 1 is a diagram of two of the patterns used in the invention.

Referring now to FIG. 1 there are shown fragments of two segments 21 and 22 of typical patterns employed by the present invention. These representations of FIG. 1 can be regarded as either portions of the actual masks in the projector or as idealized representations of the illuminated and nonilluminated areas of a portion of space as they might appear if a huge screen were erected to display such areas. For illustrative purposes, the X direction is assumed to be horizontal and the Y direction vertical. These axes may be taken as either linear or angular space coordinates at the image. The light areas in FIG. 1 are assumed to be illuminated areas while the cross hatched areas are assumed to be dark areas.

Figure 2:
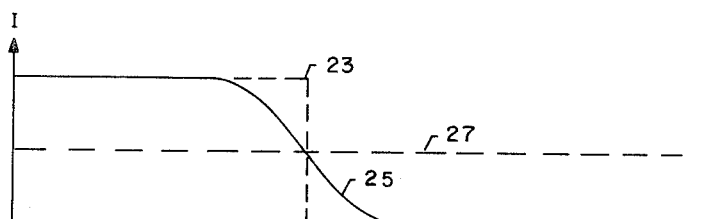
FIGS. 2 and 3 are graphs of intensity of illumination as a function of position for the patterns shown in FIG. 1.
Figure 3:
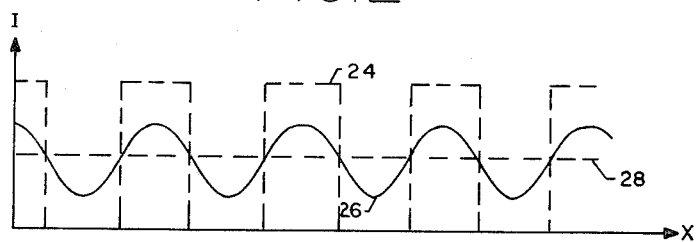

A plot of intensity versus position along the X axis would ideally show a step function for the pattern 21 and a square wave for the pattern 22. FIGS. 2 and 3 show these idealized plots by the dotted line curves 23 and 24 respectively. But no real optical imaging system can perfectly reproduce the sharp edges shown in FIG. 1. Rather, a plot of intensity versus position along the same axis would show blurred or rounded edges as indicated by the solid line curves 25 and 26 of FIGS. 2 and 3, respectively. In these figures the dashed line curves 27 and 28 represent the level of the average intensity in each case.

The exact form of the curves 25 and 26 of FIGS. 2 and 3 will depend upon the characteristics of the particular optical system being used, which characteristics are well described by the "point spread function" (or two dimensional impulse response, or "blur circle"). The dependency involved in that the curves 25 and 26 of FIGS. 2 and 3 can be arrived at from a convolution of the system point spread function with the patterns shown in FIG. 1 taking a one dimensional cross section along the X axis of the two dimensional convolution.

The waveforms shown in FIGS. 2 and 3 are the result of imaging with a system which has an approximately Gaussian point spread function. This is a common case which may arise from the interaction of several small independent defects and aberrations of the optical system plus diffraction.

As another example, if the optical system is aberrationless, or diffraction limits, with a sharply-defined circular exit pupil, the point spread function consists of a central lobe surrounded by several rings. These rings would cause the curves 25 and 26 of FIGS. 2 and 3 to show ripples near the leading and trailing edges.

Regardless of the detailed form of the intensity-versus-position curve in the projected image, the important fact remains that the position at which the curve crosses the average intensity line will remain the same even as the optical resolution is degraded. As a result, if the receiver threshold can be set at a level corresponding to the average received intensity in the pattern, such a system can be used to measure angular increments smaller than the diameter of the optical "blur" circle (point spread function).

The above discussion concerns imaging in a nonturbulent atmosphere. In a real atmosphere, temperature and pressure-induced variations in the refractive index cause variations in intensity from point-to-point and time-to-time. As a result, a plot of intensity versus position along the X axis of FIG. 1 would not be uniform as shown in FIGS. 2 and 3 but would show atmospheric induced random modulation. A plot made at a different time would show a different modulation envelope. However, as the time interval decreases, the difference between modulation envelopes becomes less.

Figure 4:
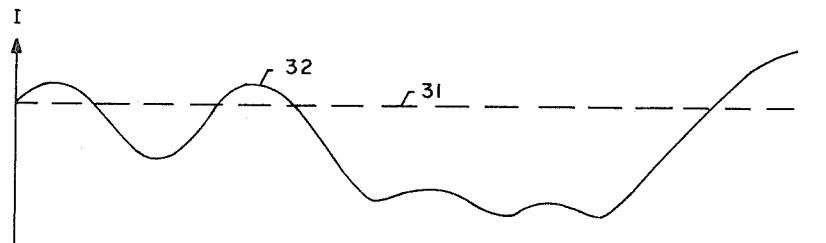
FIG. 4 is a graph showing the received intensity of illumination as a function of position when a reference pulse is transmitted.

The statistical RMS difference decreases as the time interval decreases. FIG. 4 shows the variation in the intensity of illumination received as a function of position along the X axis when the projector transmits a burst of uniform illumination over the entire field of interest. Ideally, the intensity received would also be uniform throughout the field as indicated by the dotted line 31. The solid curve 32 indicates how received intensity might actually vary with position along the X axis at any particular time $t_o$.

Figure 5:
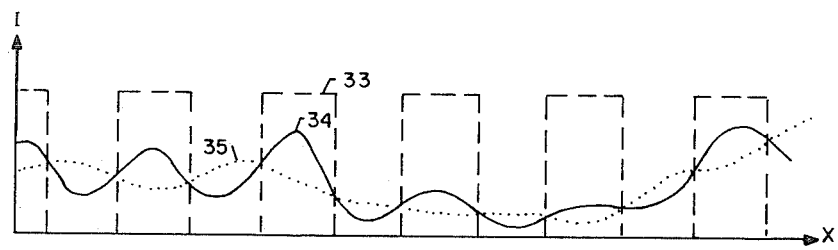
FIG. 5 is a graph showing the received intensity of illumination as a function of position when the least significant bit pattern is being transmitted.

The dotted curve 33 of FIG. 5 is essentially a repetition of the curve 24 of FIG. 3 and shows the ideal intensity variation as a function of position when a projector is transmitting the least significant bit pattern 22 of FIG. 1. The solid curve 34 of FIG. 5 represents the actual received intensity assuming that the atmospheric conditions are the same as those which produced the curve 32 of FIG. 4. If the receiver is to determine correctly whether it is in a light or a dark area it must compare the actual received intensity as is shown by the curve 34 with a reference intensity level which takes in to account the turbulence then existing in the atmosphere. Such a reference intensity level is shown by the dotted curve 35 of FIG. 5 which is simply one half the amplitude of the curve 32 of FIG. 4. It is to be noted that, due to the blurring effect previously discussed, the maxima of the curve 34 each represent an intensity somewhat less than the intensity which would be received from the same light source if transmitted uniformly to all portions of the sector.

Figure 6:
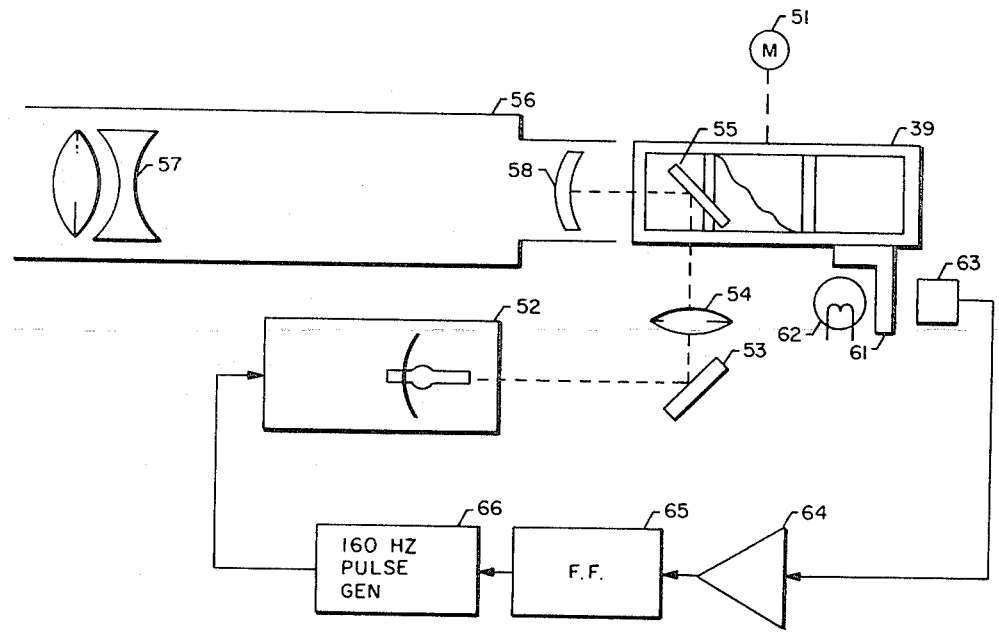
FIG. 6 is a schematic diagram of the transmitter.
Figure 7:
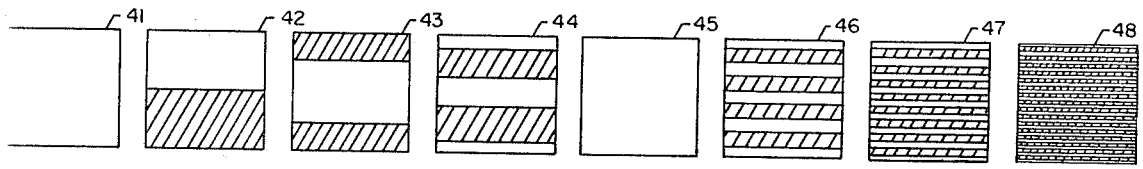
FIG. 7 is a schematic diagram of the masks used in the transmitter.

Referring now to FIG. 6 there is shown a schematic plan view of a preferred form of a transmitter. There is shown a generally cylindrical drum 39 having eight masks uniformly spaced around the periphery thereof. It is assumed for illustrative purposes that the apparatus is to be used for measuring horizontal angles and for this purpose it is preferred that the axis of the drum 39 be horizontal. Each of the masks is preferably a flat photographic plate having transparent and opaque portions. FIG. 7 shows these masks in a schematic developed view in the order in which they are arranged around the circumference of the drum 39. The mask 41 is entirely transparent. The mask 42 is the most significant pattern of the code and is half transparent and half opaque, the opaque portion being indicated by cross hatching. The masks 43 and 44 contain succeeding portions of the code. The mask 45 is another entirely clear mask. The masks, 46, 47 and 48 contain the remaining portions of the code, the mask 48 being the least significant pattern.

Returning to FIG. 6, a synchronous motor 51 is provided and connected to rotate the drum 39 at a predetermined rate which, for illustrative purposes, will be assumed to be 20 revolutions per second (rps). A light source 52, which may be a commercially available Xenon flash lamp, is provided to illuminate the masks. The lamp 52 comes equipped with its own reflector and light therefrom is directed to a mirror 53 placed at 45° angle to the principal beam, from which mirror it passes through a field lens 54 to another mirror 55 mounted within the cylinder 39 and oriented at 45° to the incident light beam so as to illuminate a predetermined location on the path of movement of the masks 41–48. In other words, the lamp 52, when energized, illuminates that mask which is then in front of the mirror 55. Opposite the mirror 55 and spaced from the drum 39 is a tube 56 containing the projection optics which comprises a doublet lens 57 and a focusing lens 58. The parts are positioned and the optical system focused so as to make the focal plane of the optical system coincide with the location of the illuminated mask.

The lamp 52 is energized in synchronism with the rotation of the drum 39. Fastened near the periphery of the drum is a protruding tab 61. To one side of this small tab is a light source 62 and on the other side is a photo detector 63. The output of the photo detector 63 is passed to an amplifier 64 and then to flip flop 65. This flip flop triggers a 160 Hz. pulse generator the output of which controls the lamp 52. It will be understood that the showing of FIG. 6 is highly schematic and that the necessary power supplies, driver circuits, etc., have been omitted in the interest of clarity in showing the theory of operation of the device.

Once each revolution of the drum 39, the tab 61 cuts off the light to the detector 63 causing its output to change. Such change in output constitutes a signal which is amplified by the amplifier 64 the output of which changes the stage of the flip flop 65. The output of the flip flop 65 is connected to the pulse generator 66 so as to enable, or operate, it during every other revolution of the drum 39. When enabled, the pulse generator 66 produces pulses having a period of 6.25 milliseconds. Each of these pulses flashes the lamp 52. Since the drum 39 rotates at 20 rps. and contains 8 masks around its periphery, one of the masks comes into the location where it may be illuminated once every 6.25 ms. The position of the tab 61 on the drum 39 is adjusted so that the flashes of the lamp 52 occur when the masks are approximately centered at the location where they may be illuminated and where their image may be projected into space. The tolerances are not severe because the lamp 52 actually used produces a flash having a duration of only about 10 or 20 microseconds and during this time the mask will not move very far. Additionally, the masks are angularly positioned so that their motion is parallel to the divisions between segments which, in this case, are assumed to be vertical, and, since we are concerned with horizontal angles, a small amount of motion has absolutely no effect. In summary, the apparatus of FIG. 6 causes an image of the masks 41–48 to be projected into space successively once every other revolution of the drum 39.

Figure 8:
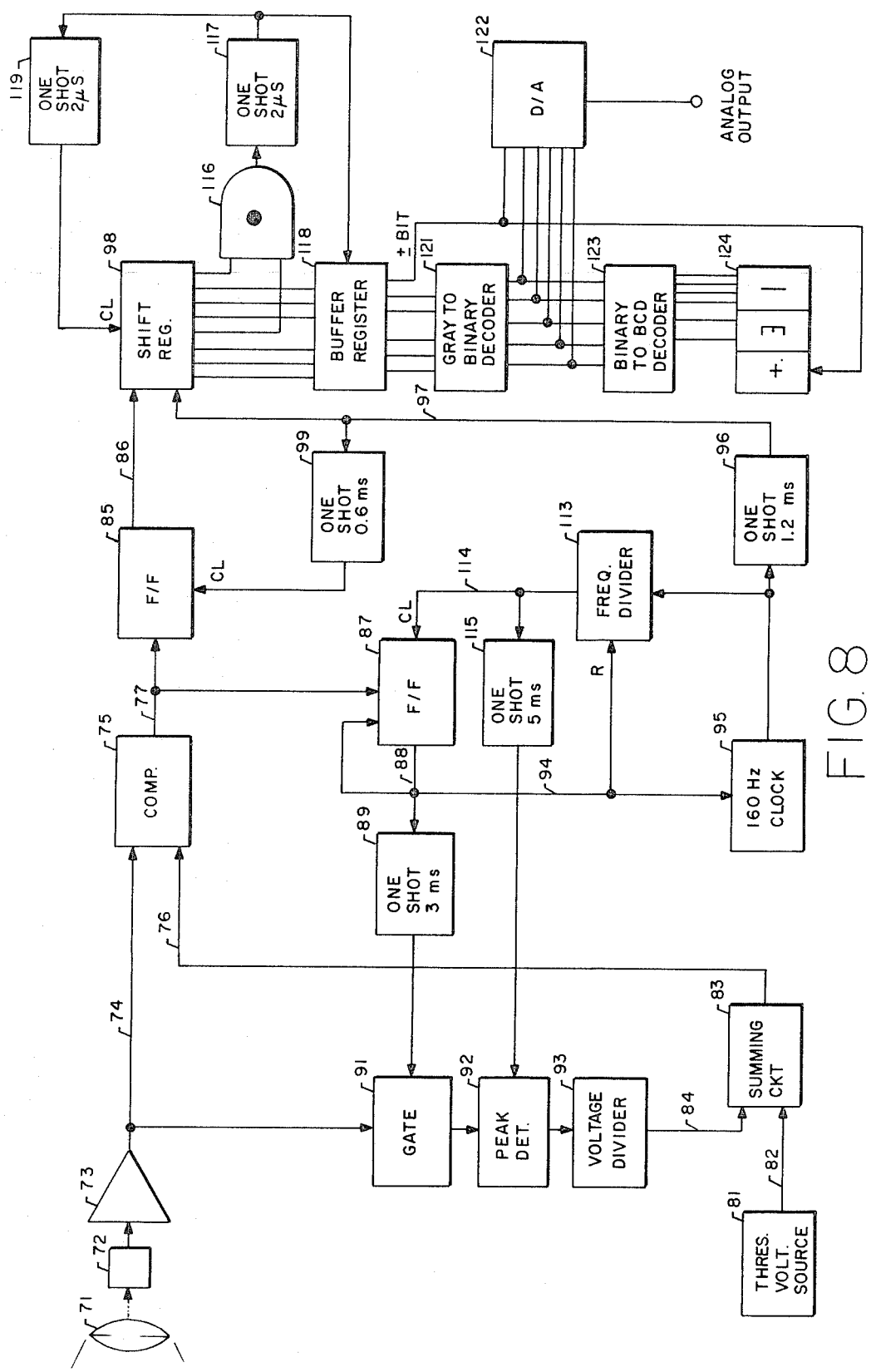
FIG. 8 is a schematic diagram of the receiver.

The receiver is shown schematically in FIG. 8. A lens 71 concentrates the light from the projector and focuses it onto a photosensitive detector 72 the output of which is passed to an amplifier 73. The output of the amplifier 73 is a voltage representing the intensity of the received energy and is connected by means of a conductor 74 to one input of a comparator 75. The other input to the comparator 75 is applied via a conductor 76 and is a voltage representing a reference intensity level. When the voltage on conductor 74 exceeds that on conductor 76 the comparator circuit 75 applies a signal to a conductor 77.

A voltage source 81 establishes a voltage on a conductor 82 indicative of an arbitrary, noise rejecting, threshold intensity. This voltage may be adjustable, but during any one sequence of operations, it normally remains fixed. The conductor 82 is connected to one input of a summing circuit 83 the other input of which is applied via a conductor 84. Initially, there is no voltage on the conductor 84 and accordingly the output of the summing circuit 83, which is connected to the conductor 76, is simply the voltage of the source 81. The remainder of the receiver can best be described by considering a typical sequence of operations.

Let us consider the moment when the transmitter of FIG. 6 is projecting an image of the first mask 41. Since this mask is clear, a flash of light will be projected to all portions of the sector of space constituting the region of operations. Light is collected by the lens 71, sensed by the detector 72, amplified by the amplifier 73, and a signal indicative of its intensity appears on conductor 74. The voltage source 81 is initially adjusted so that the voltage on conductor 76 represents an arbitrary threshold intensity just above the noise level so that the comparator 75 will not generate an output in response to a spike of noise appearing on conductor 74. Provided the voltage on conductor 74 rises to an intensity greater than this noise level, the circuit 75 will place a signal on the conductor 77. This signal is connected to a flip flop 85 and changes its stage thereby putting an output on a conductor 86.

The output of the comparator 75 on conductor 77 is also connected to a flip flop 87 and changes its stage putting an output signal on the conductor 88. This output is connected back to another input so as to lock the flip flop 87 in its new state until cleared as will be later explained. The output on conductor 88 is also connected to trigger a monostable, or one shot, multivibrator 89 so as to generate an output having a duration of three ms. which is applied so as to open a gate 91 the input of which is connected to the conductor 74. The voltage on the conductor 74 therefore passes through the gate 91 and is applied to a peak detector 92 which generates a voltage output level indicative of the peak intensity of the reference pulse as received. This voltage is applied to a circuit 93, which may be a simple voltage divider, which generates an output voltage level on a conductor 84 which is a fraction, preferably one half, of the output voltage of the peak detector 92. This voltage is termed an adaptive threshold level inasmuch as it varies with the intensity of the reference pulse as received. This voltage on conductor 84 is added to that on conductor 82 by means of the circuit 83 and appears on the conductor 76 as a voltage indicative of the reference intensity level. Since the adaptive threshold voltage on conductor 84 is normally much larger than the arbitrary noise rejecting threshold voltage level on conductor 82, the voltage on the conductor 76 is made up principally of the voltage from conductor 84.

Figure 9:
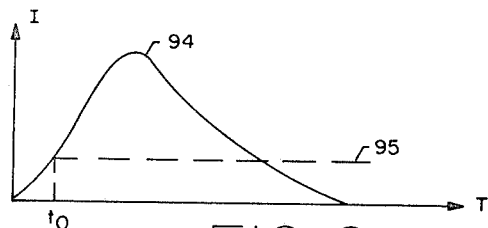
FIG. 9 is a graph showing how the intensity of the lamp varies with time.

Referring now to FIG. 9, the curve 94 represents schematically how the intensity of the lamp 52 varies with respect to time. As previously mentioned, the lamps currently in use emit a flash having a total duration on the order of 10 or 20 microseconds. The dashed line 95 represents the arbitrary noise rejecting threshold intensity so that when the intensity reaches this level, at $t_o$, the comparator circuit 75 generates an output. Since the circuits 75, 87, 89 and 91 operate in a matter of nanoseconds, the gate 91 is opened in plenty of time to allow the peak detector 92 to generate a voltage indicative of the peak intensity of the reference pulse as received. The circuits 93 and 83 also operate in nanoseconds so that the adaptive threshold intensity signal appears on conductor 76 and becomes the reference intensity level against which the intensity of subsequently received pulses are compared.

The output of the flip flop 87 on conductor 88 is also connected by means of a conductor 94 as an enabling voltage so as to initiate and maintain the operation of a 160 Hz clock 95. The first pulse from this clock 95 appears almost immediately and triggers a one shot multivibrator 96 which generates an output pulse on a conductor 97 having a duration of 1.2 ms. This pulse is applied to a shift register 98 so as to enter into the register whatever signal is on conductor 86. It will be recalled that a signal is put on conductor 86 upon the receipt of the reference pulse and this signal is regarded as a "ONE". The conductor 97 is also connected to a one shot multivibrator 99 which is triggered by the trailing edge of the pulse from the one shot 96 and generates a pulse of 0.6 ms duration. This pulse is applied to the flip flop 85 so as to clear it.

Figure 10:
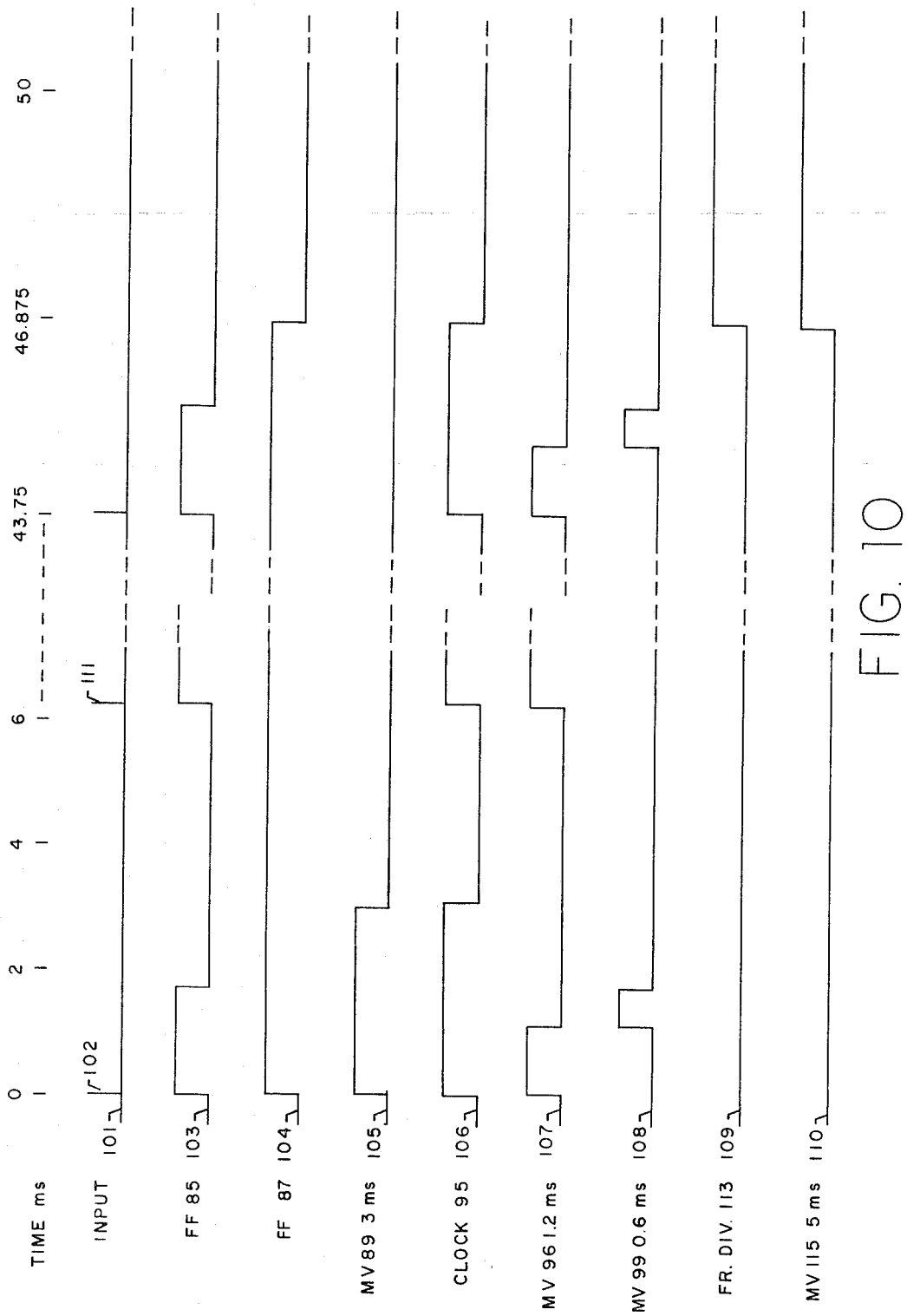
FIG. 10 is a timing diagram.

The timing of the various operations so far described can be seen clearly in FIG. 10. In this diagram, time is measured in milliseconds and time 0 is considered to be the moment when the signal from the reference pulse appears at the output of comparator 75 on the conductor 77. The input signal is represented by the curve 101 and, since the duration of flash from the lamp 52 is measured in microseconds, the input signal 102, representing the reference pulse transmitted through the mask 41, is shown in FIG. 10 as simply an instantaneous spike. By means of the circuits previously described, the flip flops 85 and 87 and the multivibrator 89 generate outputs almost immediately as shown by the curves 103, 104 and 105. The curve 106 shows the output of the clock 95 which has a period of 6.25 ms. The curve 107 shows the output of the multivibrator 96 which determines the width of the clock pulses into the shift register 98. The curve 108 shows the pulse output of the multivibrator 99 which starts at the trailing edge of the pulse of the multivibrator 96 and is used to clear the flip flop 85. The trailing edge of this pulse clears the flip flop 85 at time 1.8. At time 3, as shown by the curve 105, the multivibrator 89 returns to its former state and the gate 91 is closed.

To summarize what has happened up to now, the reference pulse has been received, compared with the reference intensity level which, at this time, is the arbitrary threshold level, and assuming that it exceeds this level, the clock has been started, a ONE has been entered into the shift register 98, and an adaptive threshold intensity level has been established and applied by the conductor 76 to the comparator 75. The receiver is now in condition for the receipt of the next signal corresponding to that from the mask 42.

The next signal will appear at time 6.25 and, assuming that the receiver is in a portion of the sector corresponding to the transparent area of the mask 42, an information pulse will be received. Assuming that it is in excess of the reference intensity, which is now the adaptive intensity level, a signal as shown at 111 at FIG. 10 will appear at the output of the comparator 75 on the conductor 77. A sequence of events similar to those previously described will occur with the ONE being entered into the shift register 98. However, the flip flop 87 will not be changed because, it will be recalled, it was locked in when the initial reference pulse was received. Therefore, the gate 91 will remain closed and the signal on conductor 76 will remain unchanged.

A similar sequence of events will occur as the images of each of the remaining masks are projected into space. Of course, if the receiver is in a portion of the sector corresponding to an opaque section of one of the masks, the adaptive threshold level is not exceeded and no output appears on conductor 77. However, the clock 95 continues to operate and a ZERO is entered into the shift register 98. When the image corresponding to mask 45 is projected, an input signal will be received (assuming adequate intensity) regardless of the position of the receiver within the sector of operations.

In order to terminate operations and get ready for a new set of operations after images of all eight masks have been projected, a frequency divider 113 is provided which is connected to the output of the clock 95 and in effect divides this output by eight and generates an output of its own on conductor 114 at the trailing edge of the eighth pulse from the clock 95, as shown by the curve 109 of FIG. 10. This output clears the flip flop 87 as shown by the curve 104 and also initiates operation of a one shot multivibrator 115 which generates a pulse having a duration of 5 ms. This pulse is applied to the peak detector 92 to reset it to zero in preparation for an entirely new sequence of operations.

The occurrence of the eighth clock pulse from the clock 95, beginning at time 43.75, operates, through the multivibrator 96, to shift the shift register one place regardless of whether the input on conductor 86 is a ZERO or a ONE. This means that the reference pulse, corresponding to transmission of the mask 41, which is a ONE, will now be in the eighth place of the shift register 98 while the signal corresponding to the mask 45 will be in the fourth place of the register 98. This latter signal should, of course, be a ONE and will be if transmission is satisfactory in all respects. The signals from the fourth and eighth places of the register 98 are connected to the inputs of an AND circuit 116 the output of which triggers a one shot multivibrator 117 which generates a pulse having a duration of 2 microseconds. This pulse is applied to a buffer register 118 so as to enter into this register the contents of the first, second, third, fifth, sixth and seventh places of the shift register 98 which signals correspond to the signals received during projection of the images of the masks 42– 44 and 46–48. The output of the multivibrator 117 is also connected so that the trailing edge of its pulse triggers a one shot multivibrator 119 which generates a 2 microsecond pulse which is applied to the "clear" terminal of the shift register 98 so as to prepare it for a new sequence of operations.

The connection of the fourth place of the shift register 98 to the AND circuit 116 is not strictly necessary. This connection could be omitted and the eighth place could be connected directly to the one shot multivibrator 117 and operation would be as previously noted. The use of this fourth place connection is just sort of an added safety factor. Assuming that transmission were bad and that a ONE were not received at this time but instead a ZERO were received, this would indicate that the entire data word might be in error and the connection as shown would, under these circumstances, prevent the reading out of the shift register 98 and would maintain the output of the buffer register 118 at its previous state. It would, of course, be possible to design circuitry so as to utilize the signal from the projection of the mask 45 as an up dated reference signal rather than using the signal from the projection of the mask 41 as the sole reference signal for the entire 6 bits of the word. However, it is at present thought that the additional complication is not warranted since the operation with the circuit shown in FIG. 8 has been found to be very satisfactory.

The digital word stored in the buffer register 118 is an indication, in the Gray code, of the angular position of the receiver with respect to the transmitter. This information can be utilized in many ways. For example, the Gray code may be converted to ordinary binary code by means of a Gray to binary decoder 121. The output of this decoder may be connected to a digital to analog converter 122 in order to obtain an analog output indicative of the angular position. In addition, the output of the decoder 121 may be connected to a binary to binary-coded-decimal decoder 123 the output of which may be connected to a digital readout device 124 in order to display visually the desired angle or position.

Figure 11:
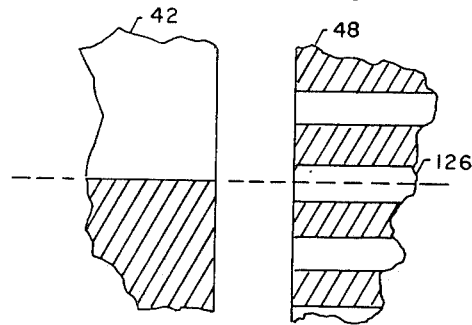
FIG. 11 is an enlarged fragmentary diagram of two of the patterns.

In the preferred embodiment being described, it is desired to regard a vertical plane through the longitudinal axis of the transmitter as the reference, or zero, plane and to measure the angle between this plane and the vertical plane passing through both the observer and the transmitter. Angles to one side of the reference plane are regarded as positive and angles to the other side as negative. For the purposes of the digital readout device 124 the angles are to be indicated in units of positive and negative resolution elements. The masks 41-48 with the patterns of FIG. 7 are positioned in the transmitter so that the center line of each lies in the reference plane. In the case of the mask 42, the reference plane passes through the junction of the opaque and transparent sections, as shown more clearly in FIG. 11. For the mask 48, the reference plane passes through the center of the central transparent section 126. If all points above the center line as viewed in FIG. 11 be regarded as positive and all points below as negative, the upper half of the transparent section 126 could be regarded as an angular displacement of plus one resolution element while the lower half of the section 126 could be regarded as a displacement of minus one resolution element. Since the receiver inherently decides that it is in one or another resolution element and never decides that it is straddling two elements, there would be no ZERO indication. A ZERO position one resolution element wide could be provided by a slight modification of the code pattern and/or a slight modification of the decoding logic. However, it is preferred at present to connect the digital readout device 124 to indicate "plus zero" and "minus zero" for displacements corresponding to the upper and lower halves of the section 126. The two ZERO positions thus occupy the two central resolution elements and indications of plus and minus ONE TWO, etc starts at positions corresponding to the next adjacent resolution elements.

The use of indications as above described allows a certain amount of simplification in the decoding process. Since the most significant bit, that corresponding to the mask 42, simply represents plus and minus deviations, the most significant bit from the buffer register 118 may be connected directly to the digital to analog converter 122 and may also be connected directly to the sign indication of the digital readout device 124, bypassing the decoders 121 and 123. This permits the use of decoders of smaller capacity. However, other connections could be used.

Figure 12:
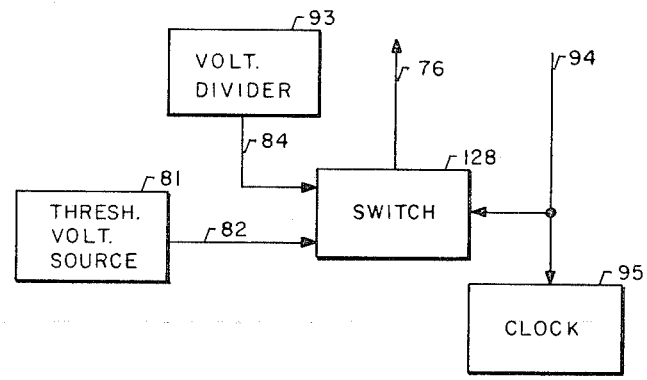
FIG. 12 is a schematic diagram showing a modification of the receiver.

It will be recalled that in the receiver illustrated in FIG. 8, the adaptive threshold voltage from the voltage divider 93 was simply added to the arbitrary noise rejecting threshold voltage from the source 81 to obtain the voltage on conductor 76 indicative of the reference intensity level. As previously mentioned, this arrangement works very satisfactorily in practice. However, for critical applications, it may be desired to be more precise and to eliminate the arbitrary threshold voltage entirely after receipt of each reference pulse and substitute therefor the adaptive threshold voltage after this has been established. This may be done quite simply as shown in FIG. 12 wherein a switch 128 takes the place of the summing circuit 83. The voltage divider 93 and the voltage source 81 are connected to this switch and are connected alternatively to the conductor 76. The switch 128 is preferably an electronic switch and may be controlled simply by the signal on conductor 94, which, it will be recalled, is indicative of the condition of the flip flop 87. As previously explained, a signal appears on this conductor soon after a signal has been placed on the conductor 77 as a result of the reception of the reference pulse and, accordingly, this is the appropriate time to switch from the arbitrary threshold voltage to the adaptive threshold voltage. As shown in the timing diagram of FIG. 10, the flip flop 87 remains in this stage until the trailing edge of the eighth clock pulse when it returns to its former condition thereby reconnecting the source 81 through the switch 128 to the conductor 76.

Figure 13:
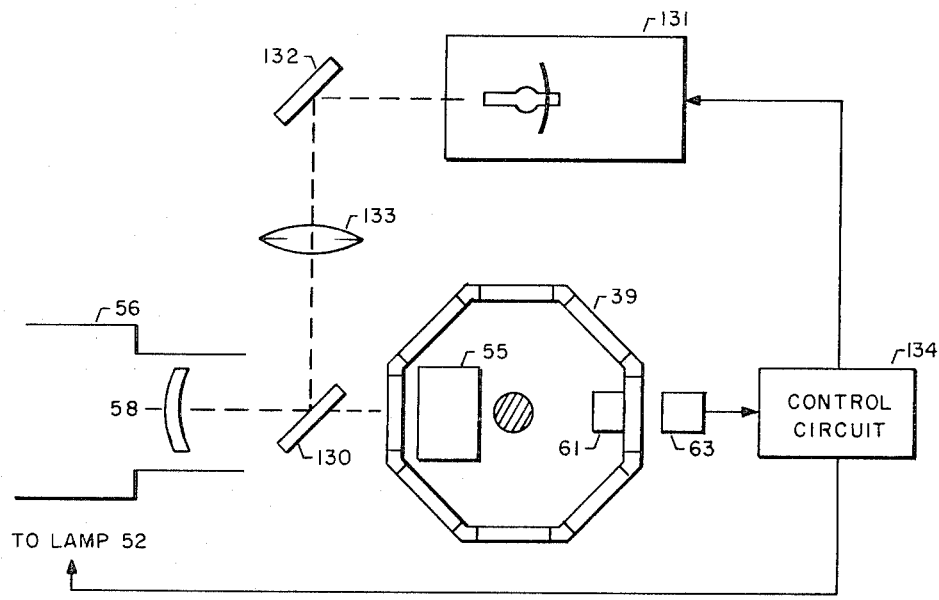
FIG. 13 is a schematic diagram showing a modification of the transmitter.

FIG. 13 is an elevation view of a modification or variation of the apparatus of FIG. 6 for generating and transmitting the reference pulses. Many of the components are identical and have been denoted by the same reference characters. It is assumed, as in the case of FIG. 6, that horizontal angles are to be measured and accordingly the drum 39 is again shown with its axis horizontal. However, FIG. 13 is an elevation view in order to show certain elements clearly. The motor 51 is not shown in FIG. 13 and is assumed to be above the plane of the paper. Similarly the lamp 52, mirror 53, lens 54 and light source 62 are assumed to be below the plane of the paper and have been omitted entirely from FIG. 13 in order to show the remaining parts more clearly. The mirror 55 is shown, and opposite thereto and spaced from the drum 39 is shown the tube 56 and the lend 58.

A beam splitter 130 is placed between the mirror 55 and the lens 58 in such a way as to allow light to pass from this mirror to the lens. An additional lamp 131, similar to the lamp 52, is mounted so that light emitted thereby strikes a plane mirror 132 and is reflected thereby to a field lens 133 (similar to the lens 54 of FIG. 6) from which it passes to the beam splitter 130 and is in part reflected therefrom to the lens 58. The protruding tab 61 is mounted as before on the drum 39 so as to interrupt periodically the light transmitted from the light source 62 (not shown in FIG. 13) to the detector 63. The output of the detector 63 is connected to a control circuit 134 which controls the operation of both of the lamps 52 and 131.

The beam splitter 130 may be any of the common types which allows a portion of the light from the mirror 55 to pass straight through to the lens 58 and which reflects a portion of the light from the lens 133 to the lens 58. The inexpensive parallel plate type of reflector, although producing ghost reflections which are intolerable in most imaging systems, may be used to advantage in the present system when positioned as shown in FIG. 13. Here the beamsplitter is tilted so that the ghost images are displaced parallel to and along the direction of the divisions of the masks (up and down as shown in FIG. 13). Not only will the resolution not suffer but in addition there is an intergrating effect which minimizes measurement errors caused by dust particles on the masks or imperfections along the sharp lines of division in the mask patterns.

In the simplest case, the drum 39 is provided with the masks 41-48 as before and the control circuit 134 energizes the lamp 131 when the clear masks 41 and 45 are opposite the lens 58 and energizes the lamp 52 when each of the masks 42-44 and 46-48 are in this position. Many different circuits can be designed to accomplish this result, one example being shown in FIG. 14.

Figure 14:
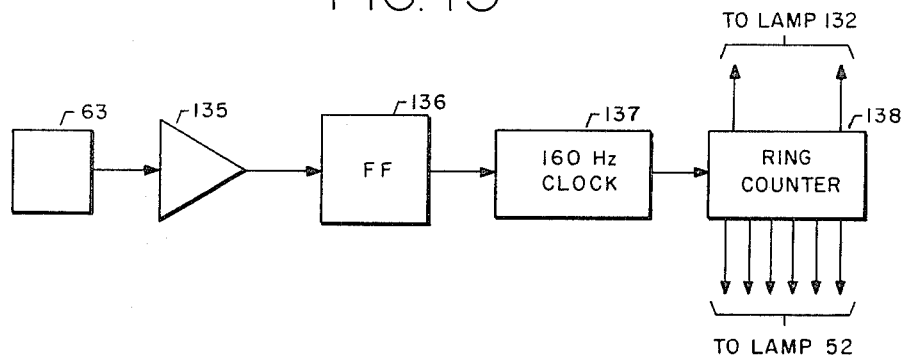
FIG. 14 is a schematic diagram showing one form of control circuit which may be a part of the transmitter of FIG. 13.

As shown in FIG. 14, the output of the detector 63 is led to an amplifier 135 the output of which triggers a flip flop 136. The latter, when in one of its stages, enables, or operates a 160 Hz clock 137, similar to the clock 66, so that it produces a series of pulses, having a period of 6.25 ms, during every other revolution of the drum 39. These pulses are led to a ring counter 138 which places an output on its eight output conductors successively in response to each clock pulse. The first and fifth conductors are connected to control the lamp 131; the second, third, fourth, sixth, seventh and eighth conductors are connected to control the lamp 52. The position of the tab 61 is selected so that the lamp 131 is energized when the clear masks are in position while the lamp 52 is energized when each of the coded masks are in position.

The use of a beam splitter and a separate lamp for the reference pulse has certain advantages and provides flexibility. For example, instead of two clear and six coded masks, all of the masks may be code masks and the circuit 134 may be designed to energize the lamp 131 before the first mask is illuminated. Since it is not necessary to wait for the recovery of lamp 131 before lamp 52 is energized, the system may be designed to make the interval between reference and code pulses quite short, thereby reducing possible changes in atmospheric state between flashes. As another example, the lamps 52 and 131 need not be identical and the beam splitter 130 may be selected to have various ratios of transmission to reflection including but not limited to "50-50", or unity. If these factors be selected so that the intensity of the reference pulse as transmitted is different from the intensity of the information pulses transmitted to light areas, the voltage divider 93 in the receiver (FIG. 2) may be adjusted to select the proper fraction of the output of the peak detector 92. For example, if the transmitted intensity of the reference pulse is one half the transmitted intensity of the information pulses directed to light areas then the voltage divider may be omitted or adjusted to select the full value of the output of the peak detector 92 as the reference intensity level.

However, the simplest case is that in which the lamps 52 and 131 are identical and the beam splitter 130 has a ratio of transmission to reflection of unity. In this case, as in the case of the transmitter of FIG. 6, the transmitted intensity of the reference pulse is equal to the intensity of the pulses which are transmitted to light areas of each pattern. Thus the reference intensity level is made equal to one half the maximum received intensity of the reference pulse.

In any of the arrangements, a very important consideration is that the intensity of the reference pulse as transmitted have a known fixed relation to the intensity of the information pulses as transmitted so that the voltage divider 93 can be adjusted to make the reference intensity level equal to one half of the maximum intensity the received reference pulse would have had if transmitted with the same intensity as the information pulses transmitted to light areas.

It is to be noted that the preferred embodiments of the invention herein described contemplate transmission of a reference pulse, receiving it and storing (in the peak detector 92) an indication of its intensity as received for comparison with the received intensity of one or more subsequently transmitted information pulses. However, there is no fundamental reason why the sequence cannot be reversed by transmitting and receiving an information pulse and storing a representation of its intensity for comparison with the received intensity of a subsequently transmitted reference pulse. However, the arrangement illustrated and described is preferred at present.

It is also to be noted that the specific embodiment described uses one reference pulse as a basis of comparison for several information pulses. It would be possible to transmit more reference pulses, for example, one reference pulse for each information pulse. However, the arrangement described has been found to be very satisfactory for present purposes.

The invention has been described in connection with light sources. However, other sources of energy can be used provided such energy can be projected in short pulses with sufficient directivity. However, it is thought at present that the invention will find its widest application when using electromagnetic energy in or near the visible portion of the spectrum.

Although a specific embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. An information transmission system including a transmitter for sequentially projecting into a predetermined sector of space a plurality of different coded patterns of energy, each pattern being transmitted as an information pulse, and each pattern comprising alternate illuminated and non illuminated areas, and including a receiver located within said sector having means for receiving and decoding the successive pulses of energy received so as to determine the angular deviation of the line of sight between the receiver and the transmitter from a reference direction passing through the transmitter, characterized in that the transmitter includes means for projecting simultaneously to all portions of said sector of space a reference pulse of energy having an intensity bearing a known relationship to the intensity of said information pulses of energy and in that said receiver includes means for receiving said reference pulse, means for deriving therefrom a reference intensity level, and a comparator for comparing said reference intensity level with the received intensity of said information pulses of energy and generating a signal indicative thereof when the latter exceeds the former.

2. An information transmission system in accordance with claim 1 in which said transmitter includes means for making the transmitted intensity of said reference pulse substantially different from the intensity of said reference pulses as transmitted to light areas.

3. An information transmission system in accordance with claim 1 in which said transmitter includes means for making the transmitted intensity of said reference pulse substantially equal to the intensity of said information pulses as transmitted to light areas.

4. An information transmission system in accordance with claim 3 in which said receiver includes means for generating a first voltage level indicative of the peak intensity of said reference pulse as received, means for generating from said first voltage level a second voltage level indicative of one half the value of said peak intensity, said second voltage level constituting said reference intensity level.

5. An information transmission system in accordance with claim 3 in which said receiver includes means for generating a first voltage level indicative of the peak intensity of said reference pulse as received, means for generating from said first voltage level a second voltage level indicative of one half the value of said intensity and constituting an adaptive threshold voltage, a voltage source for establishing a third voltage level indicative of an arbitrary threshold level, means for initially applying said third voltage to said comparator as said reference intensity level and means responsive to the receipt of said reference pulse for adding said second voltage level to said third voltage level and applying their sum to said comparator as said reference intensity level.

6. An information transmission system in accordance with claim 3 in which said receiver includes means for generating a first voltage level indicative of the peak intensity of said reference pulse as received, means for generating from said first voltage level a second voltage level indicative of one half the value of said intensity and constituting an adaptive threshold voltage, a voltage source for establishing a third voltage level indicative of an arbitrary threshold level, means for initially applying said third voltage to said comparator as said reference intensity level and means responsive to the receipt of said reference pulse for substituting said second voltage level for said third voltage level as said reference intensity level applied to said comparator.

7. An information transmissions system in accordance with claim 1 in which said transmitter includes means for establishing a predetermined relationship among the times of projection of said reference pulse and said information pulses.

8. An information transmission system in accordance with claim 7 in which said receiver includes timing means for correlating the operation of said receiver with the operation of said transmitter and means responsive to the receipt of said reference pulse for initiating operation of said timing means.

9. An information transmissions system in accordance with claim 1 in which said transmitter includes a generally cylindrical drum, a clear mask and a plurality of coded masks mounted around the periphery of said drum, means for rotating said drum about its axis, a source of radiant energy, means for directing the energy from said source to illuminate a predetermined location on the path of movement of said masks, means synchronized with the rotation of said drum for energizing said source to emit a pulse of energy as each mask reaches said predetermined location during every other revolution of said drum, and means for projecting into said sector of space an image of each of said masks as each is illuminated, whereby the projected image of said clear mask is said reference pulse and the projected images of said coded masks are said patterns.

10. An information transmission system in accordance with claim 9 in which said receiver includes a timer for generating pulses at the same rate at which said source in said transmitter is energized, means responsive to the receipt of a reference pulse having an intensity greater than that of said reference intensity level for initiating operation of said timer, a shift register, means for entering the output of said comparator into said shift register upon the generation of each pulse by said timing means, and means for reading out the contents of said shift register upon the receipt of a number of entries equal to the number of masks on said drum.

11. An information transmission system in accordance with claim 1 in which said receiver includes means for establishing an arbitrary noise rejecting threshold intensity and initially applying such threshold intensity to said comparator as said reference intensity level, means for deriving from said reference pulse an adaptive threshold intensity indicative of one half the peak intensity of said pulse as received, and means responsive to the receipt of said reference pulse for adding said adaptive threshold intensity to said arbitrary threshold intensity and applying the resultant to said comparator as said reference intensity level.

12. An information transmission system in accordance with claim 1 in which said receiver includes means for establishing an arbitrary noise rejecting threshold intensity and initially applying such threshold intensity to said comparator as said reference intensity level, means for deriving from said reference pulse an adaptive threshold intensity indicative of one half the peak intensity of said pulse as received, and means responsive to the receipt of said reference pulse for substituting said adaptive threshold intensity for said arbitrary threshold intensity as said reference intensity level.

* * * * *